Patented Nov. 19, 1929

1,735,957

UNITED STATES PATENT OFFICE

HENRY DREYFUS, OF LONDON, ENGLAND

MANUFACTURE OF ACETIC ANHYDRIDE

No Drawing. Application filed April 3, 1926, Serial No. 99,661, and in Great Britain April 9, 1925.

This invention relates to the manufacture of acetic anhydride from acetic acid.

In Bulletin de la Société Chimique de France Vol. XXXI (1922) pages 113-118 experiments are described wherein acetic acid vapour is led through platinum tubes heated to about 1150° C. In these experiments, on rapid passage of the vapour, small quantities (less than 1%) of acetic anhydride were obtained, the major part of the liquid obtained by condensation of the reaction vapours consisting of acetic acid, and when the acetic acid vapour was passed at slower rates the products of decomposition contained no anhydride, and quantities of gases such as methane, acetylene, hydrogen, carbon dioxide were formed.

As the result of further study and investigation I have found that acetic anhydride may readily be obtained by subjecting acetic acid vapour to the action of moderately high temperatures or high temperatures, provided that the gases or vapours on leaving the reaction zone are at once subjected to fractional condensation so as to separate the anhydride immediately from water vapour formed.

According to the present invention I subject acetic acid vapour to the action of moderately high or high temperatures and subject the resulting vapours immediately to fractional condensation, whereby the acetic anhydride formed by the reaction is separated from the water. The water can be allowed to pass off in vapour form; or if desired the water vapour may be condensed or treated in any suitable way to recover any acetic acid or acetic anhydride remaining in it.

The fractional condensation may be effected by leading the hot vapours from the reaction through any suitable apparatus, for example up through a fractionating column or a series of fractionating columns, and in this way it is possible to separate the anhydride from practically all of the water vapour split off by the reaction.

Especially favourable results are obtained when the process is executed under the reduced pressure or vacuum while simultaneously subjecting the vapours from the reaction to fractional condensation.

The reaction may be performed in presence or absence of catalysts or contact or filling materials, but the use of such substances may be of assistance to the reaction.

In carrying out the invention the acetic acid vapour may for instance be subjected to the reaction by passing through tubes or other apparatus heated to the desired temperature, containing or not containing filling material or one or more contact substances or catalysts, and the reaction vapours be led thence on to the fractional condensation apparatus,—e. g. upwards through a fractionating column or a series of fractionating columns,—whereby the anhydride and water vapour formed are separated; preferably the system is maintained under reduced pressure or vacuum.

In order to effect the separation of the anhydride from the water vapour, the fractionating column or columns or other apparatus used for the fractional condensation should be maintained at temperatures higher than the boiling point of water at the pressure obtaining therein, and preferably intermediate between the boiling points of acetic anhydride and water under the conditions of pressure obtaining. Reduced pressure or vacuum is preferably employed. The water vapour may be allowed to escape; or if desired it may in turn be condensed or be otherwise treated in any suitable way to recover any acetic anhydride remaining in it.

It will of course be understood that the fractional condensation of the hot reaction vapours may be conducted so as to separate the acetic anhydride to any desired extent from any unconverted acetic acid.

The tubes or other form of apparatus forming the hot reaction zone may be made of any suitable material, copper being especially suitable for the purpose, and where high temperatures are used, earthenware or like apparatus may be used with advantage.

As catalysts or contact or filling materials, substances such as sodium sulphate, sodium bisulphate, sodium pyrosulphate, calcium sulphate and the like may be employed, as such, or deposited on or mixed with porous materials such as pumice, kieselguhr and the like. Any other suitable catalysts or contact materials or filling materials may be employed.

The reaction may be performed at temperatures from about 200–300° to 700° C. or higher temperatures, e. g. up to about 1000° C., though the use of such higher temperatures is less advantageous.

In order to obtain the highest yields of anhydride by the process, the speed of passage of the vapours should be so regulated that no substantial decomposition shall take place into gaseous products, which is especially liable to happen at low speeds, particularly at high temperatures. The higher the temperature the higher should be the speed of passage of the vapours, as prolonged action at high temperatures may cause the anhydride to be split up into gaseous products.

It will be understood with regard to catalysts or contact materials, that certain catalysts or contact materials may require higher temperatures than others, or certain catalysts or contact materials may require or allow the employment of lower temperatures.

By the process of the present invention it is possible to obtain much higher yields of acetic anhydride than are indicated in the literature above referred to. It is possible by the process to obtain very substantial or even almost complete conversion of the acetic acid, and to avoid entirely or to a large extent reforming of acetic acid in the reaction vapours, and further to avoid splitting up the acetic acid or anhydride into gaseous decomposition products.

By the process it is possible to obtain anhydride substantially free from water and diluted only with acetic acid.

The anhydride obtained according to the present invention may be purified in any suitable way.

The term contact materials as used hereinafter in the claims is to be understood to include catalysts and filling materials.

What I claim and desire to secure by Letters Patent is:—

1. Process for the manufacture of acetic anhydride, comprising decomposing acetic acid vapour by the action of heat and subjecting the reaction vapours to fractional condensation to separate the acetic anhydride.

2. Process for the manufacture of acetic anhydride, comprising decomposing acetic acid vapour by the action of heat in presence of contact materials and subjecting the reaction vapors to fractional condensation to separate the acetic anhydride.

3. Process for the manufacture of acetic anhydride, comprising decomposing acetic acid vapour at temperatures from about 300° to 700° C. in presence of contact materials and subjecting the reaction vapours to fractional condensation to separate the acetic anhydride.

4. Process for the manufacture of acetic anhydride, comprising decomposing acetic acid vapour under reduced pressure by the action of heat and subjecting the reaction vapours to fractional condensation to separate the acetic anhydride.

5. Process for the manufacture of acetic anhydride, comprising decomposing acetic acid vapour under reduced pressure at temperatures from about 300° to 700° C. in presence of contact materials and subjecting the reaction vapours to fractional condensation to separate the acetic anhydride.

6. Process for the manufacture of acetic anhydride, comprising decomposing acetic acid vapour in copper apparatus by the action of heat and subjecting the reaction vapours to fractional condensation to separate the acetic anhydride.

7. Process for the manufacture of acetic anhydride, comprising decomposing acetic acid vapour at temperatures from about 300° to 700° C. in presence of contact materials in copper apparatus and subjecting the reaction vapours to fractional condensation to separate the acetic anhydride.

In testimony whereof I have hereunto subscribed my name.

HENRY DREYFUS.